July 13, 1943.  A. THOMAS ET AL  2,324,438
STATISTICAL MACHINE
Filed Dec. 30, 1938   9 Sheets-Sheet 5

Inventors.
A. Thomas & N. G. Holder
by Sydney R. Page
Attorney

July 13, 1943.   A. THOMAS ET AL   2,324,438
STATISTICAL MACHINE
Filed Dec. 30, 1938   9 Sheets-Sheet 7

Inventors
A. Thomas & N. G. Holder
by
Sydney R. Page
Attorney

Patented July 13, 1943

2,324,438

UNITED STATES PATENT OFFICE 2,324,438

STATISTICAL MACHINE

Arthur Thomas, Wallington, and Norman Geoffrey Holden, Carshalton, England, assignors to Powers Accounting Machines Limited, London, England, a company of Great Britain Application December 30, 1938, Serial No. 248,500
In Great Britain January 5, 1938

6 Claims. (Cl. 235—61.7)

This invention relates to record sensing mechanism for statistical machines.

The usual form of record card has 45 columns for the reception of perforations, there being 12 index point positions in each column. It has already been proposed to double the card capacity by placing a second set of perforations in the spaces between the perforations already made in the card. Such a card will contain two separate sets of record perforations, the perforations of one set being displaced in the direction of the length of a column with regard to the perforations of the other set.

An object of the present invention is to provide card sensing mechanism which is capable of reading both sets of record perforations in a single passage of the card through the machine.

One form of machine for reading such regular and interspaced perforations forms the subject matter of United States Patent No. 2,290,827, issued to Arthur Thomas on July 21, 1942, and comprises the combination of a reciprocable sensing pin box, means for arresting and holding a card in a first sensing position relative to said pin box during two consecutive reciprocations of the pin box and for then releasing said card, means for arresting and holding the card in a second sensing position relative to said pin box during the next two consecutive reciprocations of the pin box and for then releasing said card, said second sensing position being spaced relatively to said first sensing position one half the pitch of the sensing pins along the card path, a plurality of columns of settable stops, a first transmission means for setting said stops from one group of columns of pins in the pin box, a second transmission means for setting the same stops from another group of columns of pins in the pin box, a disabling device to each of said transmission means, means for rendering the disabling device for the first transmission means effective and ineffective at alternate reciprocations of the pin box, and means for rendering the disabling device for the second transmission means ineffective when the other disabling device is effective and vice versa.

A record card controlled statistical machine according to the present invention, having card sensing means including a control sensing element positioned to sense a control hole in a card, includes the combination of a front card stop and a rear card stop of which the front card stop is so disposed in relation to the sensing means as to arrest a card in position for sensing of holes punched therein in the normal hole positions thereon, while the rear card stop is disposed behind the front card stop by a distance equal to half the pitch of the hole positions along a card column. Thus said rear card stop, when projected alone into the card path, arrests a card in position for sensing holes displaced from the normal hole positions by half the pitch of said hole positions.

The machine further includes means normally operative to feed a card to said sensing means at each operation thereof, means normally operative to move both said card stops into the card path at each operation of said sensing means, a device for retaining the rear card stop in the card path during the next sensing operation, and a device for preventing movement of the front card stop into the card path during said next sensing operation.

Finally the machine includes means operable by said control hole sensing element to render all said three devices effective contemporaneously.

A record card controlled tabulating machine according to the invention may include means normally operative to feed a card at each sensing operation, two card stops, one in advance of the other, means normally operative to move both card stops into the card path at each sensing operation and means operative when a control hole in a card is sensed to retain the rear card stop in the card path during the next sensing operation, to prevent movement of the front card stop into the card path during said next sensing operation and also to prevent a new card from being fed during said next sensing operation.

According to a feature of the invention in a record card controlled tabulating machine having group control mechanism for initiating a total taking operation when a change in group designation occurs, means is provided which is operative when the control hole is sensed to delay the total taking operation for one operation of the sensing means.

One embodiment of the invention will now be described with reference to the accompanying diagrammatic drawings which illustrate the invention as applied to a record card controlled tabulating machine.

The cards are fed by means of a picker knife 1 (Fig. 1) from the usual card magazine 2 through a card throat 3 to feed rolls 4 which convey it to the fixed pin plates 5 of a reciprocating designation pin box indicated generally at 6. Secured to the frame of the pin box 6 is a card stop 6b which moves up and down with the pin box and arrests the card in the sensing position in the well known manner.

The picker knife 1 is reciprocated by means of two arms 7 of which only one is shown, these arms being secured to a picker operating shaft 8 carrying an arm 9 pivoted to an eccentric rod 10 actuated by an eccentric (not shown) secured to a shaft 12.

The construction of the designation pin box 6 is the same as that described in U. S. patent specification No. 1,661,684, issued March 6, 1928, the pin box being reciprocated by means of connecting rods 13 (of which only one is shown) driven by means of eccentrics 14 secured to the shaft 12.

The mechanism for driving the shaft 12 is also described in specification No. 1,661,684 and includes a pinion 15 free on the shaft 12 and meshing with a quadrant 16 mounted on a shaft 17. The pinion 15 is connected to the shaft 12 by a one way drive as described in the aforesaid prior specification, so that the movement of the quadrant 16 in the counterclockwise direction only, drives the shaft 12, the return movement of the quadrant serving merely to rotate the pinion 15 idly on the shaft.

The quadrant is oscillated by an arm 18 secured to a shaft 19 and engaging with an arm 20 on the quadrant, which is maintained in contact with a roller 21 on the arm 18 by means of a spring 22 secured to a lug 23 on the quadrant.

The shaft 19 is rotated from the tabulator main shaft 24 by means of gear wheels 25, 26, and the gear wheel 26 also engages with a gear wheel 27 freely mounted on the shaft 12 and serving to drive the feed rolls 4 through intermediate gearing 28.

As is well known, the designation field of each card is read by the designation pin box 6 and the field or fields of the card containing data or items other than designations are sensed by a separate pin box indicated generally at 29, the item sensing pin box 29 being disposed relatively to the designation pin box 6 so that the card is sensed by the pin box 29 one cycle or revolution of the main shaft 24 later than it is sensed by the pin box 6.

The item sensing pin box 29 is constructed in the manner described in British specification No. 401,012 and is reciprocated by a cam on the main shaft 24 in the manner described in that prior specification.

In order to permit two sensing operations to be performed on a card while in the item sensing pin box 29, two card stops 30 and 31 are provided for the pin box 29. The pin box 6, however, has only one card stop which is fixed to the pin box and moves with it in the usual manner.

Figure 3:
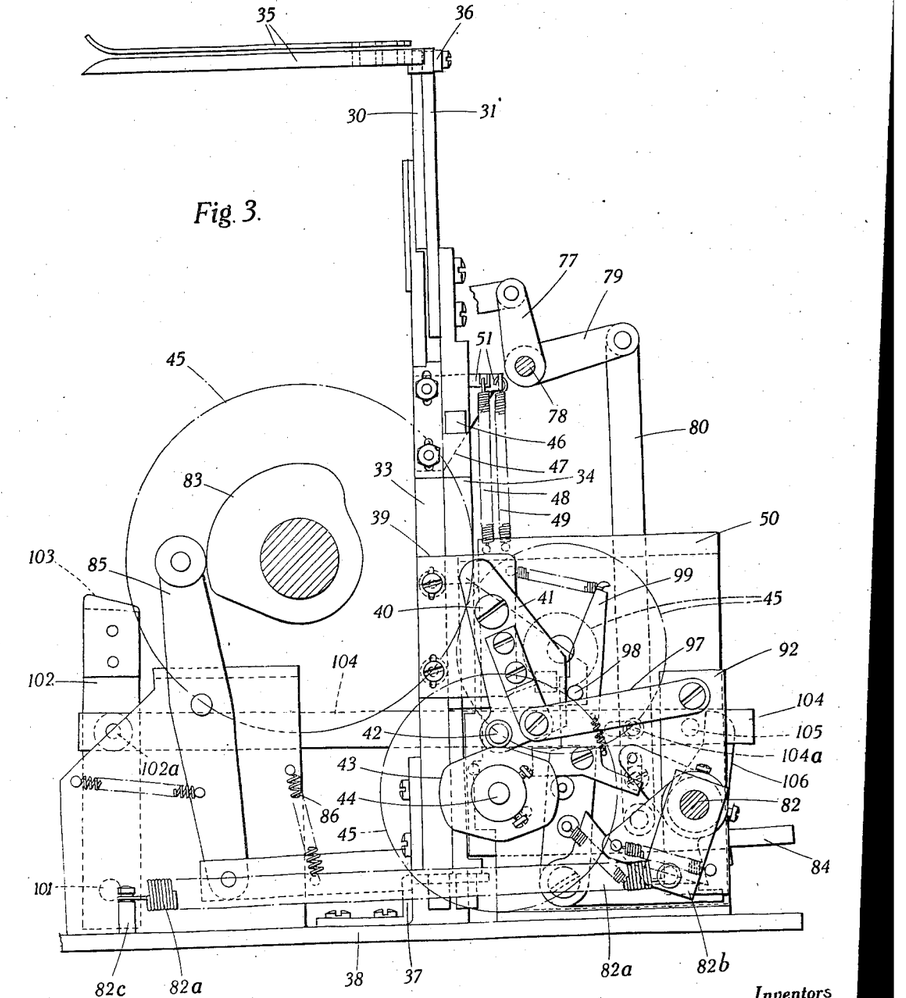
Fig. 3 is an outside elevation of the card stop control mechanism.
Figure 4:
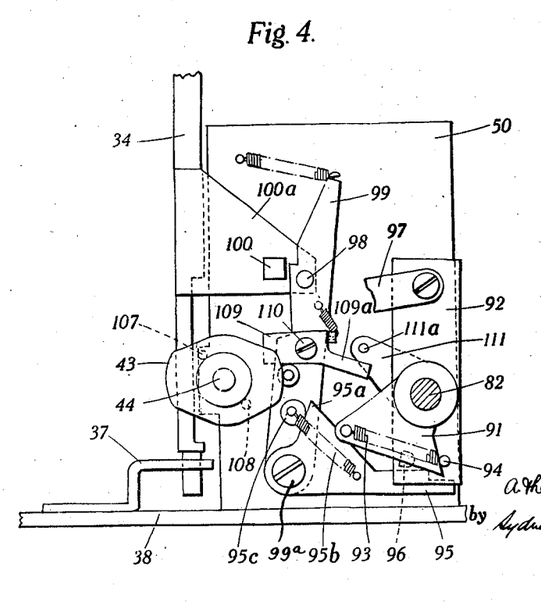
Fig. 4 is an outside elevation of part of the mechanism shown in Fig. 3, certain parts being omitted to show other parts behind more clearly.
Figure 5:
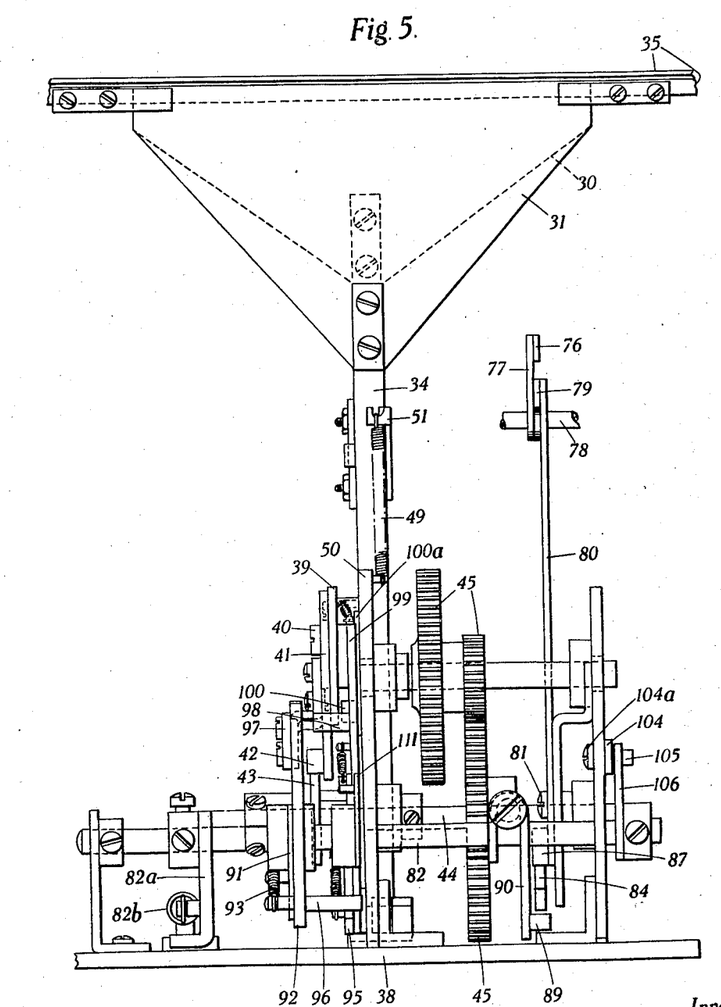
Fig. 5 is an elevation of the card stop control mechanism, viewed from the right hand side of Fig. 3.

Each of the card stops 30, 31 is carried at the upper end of a post 33, 34 (Figs. 1, 3, 4 and 5) respectively. The card stops 30 and 31 are guided in a slot formed between the pin plates 35 of the item sensing box and a fixed block 36 (Fig. 3) and the posts 33, 34, are guided at their lower ends in a bracket 37 fixed to the base plate 38 (Figs. 3 and 4).

The front card stop post 33 carries a bracket 39 to which is pivoted at 40 a triangular plate 41 carrying a roller 42 engaging with a cam 43 secured to a shaft 44.

The shaft 44 is driven at half the speed of the main shaft 24 by means of gear wheels 45, that is to say for each revolution of this half speed shaft 44 the item sensing pin box 29 and the adding and printing mechanism of the tabular-to-execute two complete cycles of operation.

The cam 43 is of double form and its peaks are 180° apart so that normally the front card stop 30 is raised twice during each revolution of the half speed shaft 44, i. e., once for each reciprocation of the pin box 29.

The rear card stop post 34 carries an abutment 46 overlying an abutment 47 on the front card stop post 33, so that the front card stop post 33 when raised will also lift the rear post 34 but can descend independently of the latter. The two card stops are lowered by independent springs 48 and 49 secured to a frame plate 50 at their lower ends and at their upper ends to attaching members 51 on the respective card stop posts.

Since the arm 18 (Fig. 1) already described is rotated from the tabulator main shaft 24, the card feed quadrant 16 which actuates the designation sensing pin box 6, the picker knife 1 and the feed rolls 4, tends to operate to feed a card to the pin box 6 and to cause a reciprocation of said pin box 6 at each reciprocation of the pin box 29, and normally the quadrant operates in this manner.

Figure 2:
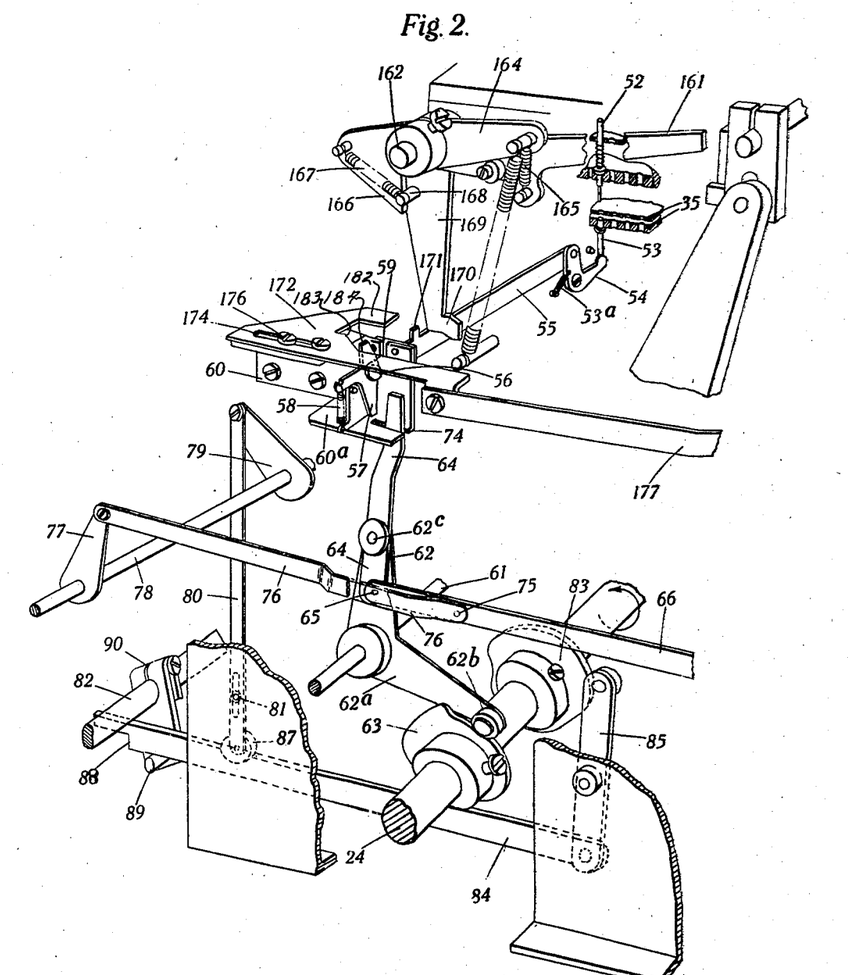
Fig. 2 is a perspective view showing the means for operating the card stop control mechanism.
Figures 6, 8:
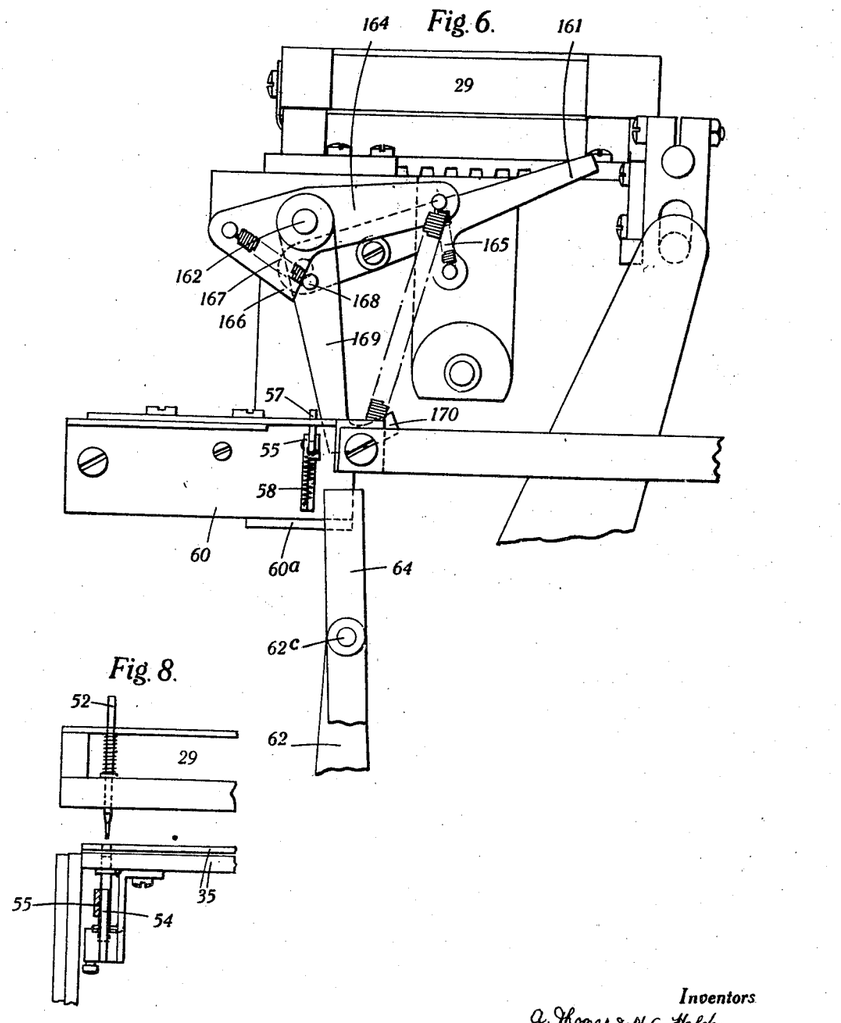
Fig. 6 is an outside elevation of one end of the item sensing pin box.
Fig. 8 is a section on the line VIII—VIII of Fig. 7.
Figure 7:
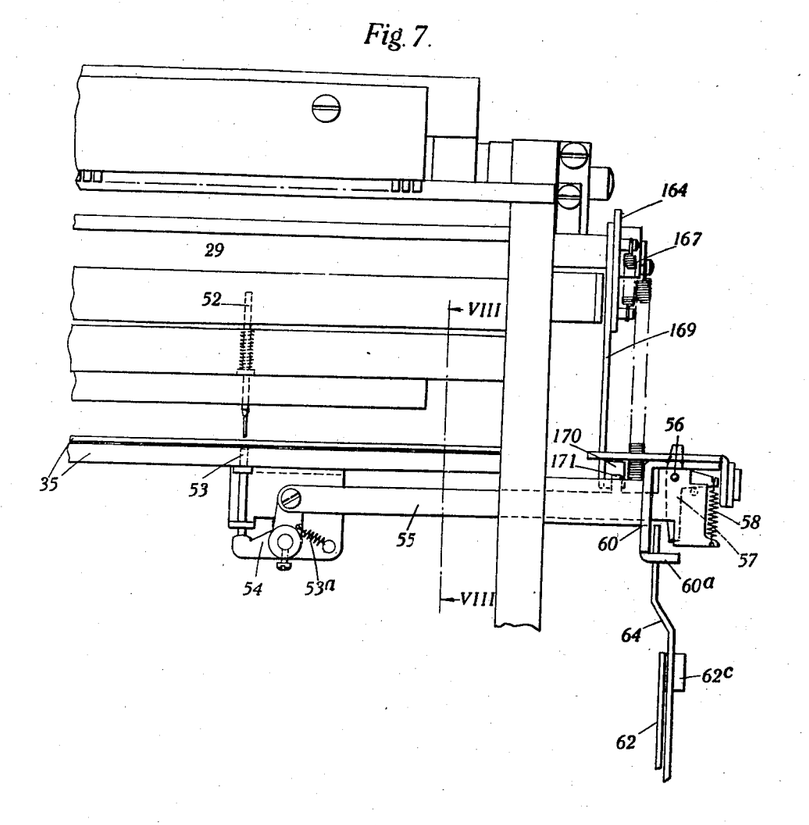
Fig. 7 shows the control sensing pin and the mechanism actuated thereby.

Each card having two sets of data perforations is provided with a special control hole which is sensed by a control pin 52 in the item sensing pin box 29 (see Figs. 2, 7 and 8). When this pin 52 passes through a control hole in a card it pushes down a small pin 53, which is urged upwardly by a spring 53a and of which the upper end projects into the lower pin plate 35. This small pin 53 when depressed rocks a bell crank 54 which pulls a horizontal slide 55 to the left in Fig. 7 (to the right in Fig. 2). The slide 55 is normally held to the right in Fig. 7 by the spring 53a and carries at its right hand end (Fig. 7; left hand end in Fig. 2) a depending arm 57 pivoted to the slide at 56 and held in position by a spring 58. The slide 55 is guided at its left hand end (Fig. 2) in a slot 59 formed in the vertical portion of a bracket 60.

Pivoted on a shaft 61 (Figs. 1A and 2) is a bell crank 62, 62a of which the arm 62a carries a roller 62b engaging with a cam 63 secured to the main shaft 24. Pivoted at the upper end 62c of the arm 62 is a testing lever 64, the lower end of this lever 64 being pivoted at 65 (Fig. 2) to a horizontal link 66 pivoted at its other end to an arm 67 (Figs. 1 and 9) freely mounted on a shaft 68. Also freely mounted on this shaft 68 is an arm 69 connected by a spring 70 to the arm 67, on which a nose 71 is pulled by the spring 70 against a pin 72 on the arm 69. The arm 69 is connected by a vertical link 173 to mechanism which will be described later. This mechanism includes a spring 156 which pushes the lever 173 downwardly thereby tending to hold the link 66 to the right in Figs. 2 and 9 (left in Fig. 1) and the lower end 65 of the testing lever 64 stationary.

The upper end of the testing lever 64 is guided in a slot 74 formed in a horizontal portion 60a of the bracket 60 (Figs. 2 and 6).

The bell crank 62, 62a is rocked at each machine cycle by the cam 63, and if the upper end of the testing lever 64 is free to move, the testing lever will rock counter-clockwise (Fig. 2) about its pivot 65 which is normally held stationary by the action of the spring 156 controlling the link 173.

Figure 9:
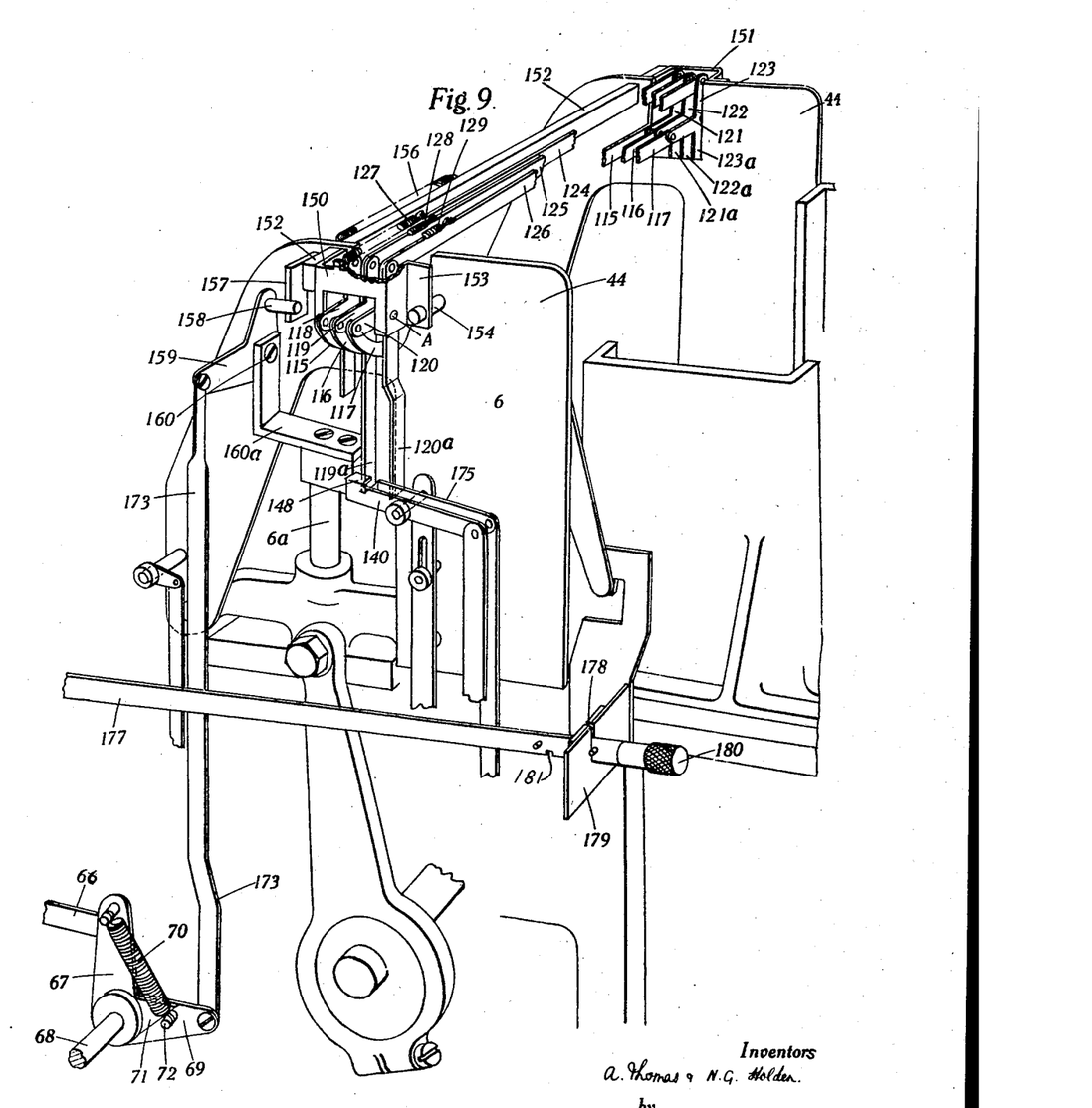
Fig. 9 is a perspective view of the mechanism for delaying the total taking operation for one cycle when the last card of a group contains two sets of data.

The upper end of the testing lever 64 rocks adjacent to the arm 57 pivoted to the slide 55, and the position of the slide 55 is normally such that the arm 57 is clear of the path of movement of the upper end of the testing lever 64, so that the latter is free to rock. When, however, the control pin 52 senses a hole it depresses the small pin 53 thereby rocking the bell crank 54 and pulling the slide 55 to the right in Fig. 2 so that the arm 57 stands in the path of the upper end of the testing lever 64. Now when the bell crank 62, 62a rocks, the upper end of the testing lever 64 is obstructed by the arm 57 whereby the testing lever is caused to rock clockwise (Fig. 2) about the pivot 62c thereby pulling the link 66 to the left, rocking the arm 67, 69 counter-clockwise and raising the link 173 (Fig. 9). The operation which is performed as a result of raising the link 173 will be described later.

Pivoted to the link 66 at 75 is another horizontal link 76 (Figs. 1 and 2) pivoted to an arm 77 secured to a shaft 78 to which is also secured an arm 79. Pivoted to the arm 79 is a vertical push rod 80, which is guided for vertical reciprocation by means of a slot engaging a pin 81 secured to a fixed frame plate.

Consequently when the link 66 is moved to the left by the obstruction of the upper end of the sensing lever 64, the link 76 is also moved to the left whereby the shaft 78 is rocked counterclockwise and the push rod 80 is depressed.

This depression of the push rod 80 effects rocking of a shaft 82 which will hereinafter be referred to as the two-stage shaft (see Figs. 1 to 5).

In order to cause rocking of the two-stage shaft 82 the following mechanism is provided. Secured to the tabulator main shaft 24 is a cam 83 (Figs. 1 and 2), which at each revolution reciprocates a slide 84 by means of a pivoted lever 85. The slide 84 is guided for longitudnal reciprocation in a bracket (not shown) and is pulled upwardly by a spring 86 against a roller 87 on the lower end of the push rod 80.

The slide 84 has a shoulder 88 at its free end and the spring 86 normally holds the slide in such a position that, as the slide reciprocates, its shoulder 88 passes clear of a pin 89 on an arm 90 secured to the two-stage operating shaft 82.

As already described, when the control pin 52 senses a hole it causes depression of the push rod 80, whereby the slide 84 is depressed to bring its shoulder 88 into the path of the pin 89. It may here be pointed out that the relative timing of the cams 63 and 83 is such that the push rod 80 does not descend until the slide 84 has moved to the left (Fig. 1) sufficiently to permit the shoulder 88 to pass to the left beyond the pin 89.

When the slide 84 is thus pushed down the shoulder 88 during the return movement of the slide 84 to the right (Fig. 1) engages the pin 89 and rocks the two-stage shaft 82 counter-clockwise, (Figs. 1, 3 and 4) against the action of a spring 82a secured at one end to an arm 82b on the shaft 82 and at the other end to a post 82c attached to the base plate 38.

Secured to the two-stage shaft 82 is an arm 91 and freely mounted on the shaft 82 is a lever 92 (Fig. 4) to which the arm 91 is connected by a spring 93. When the two-stage shaft 82 is rocked counter-clockwise by the action of the slide 84, the arm 91 secured to said shaft positively moves the lever 92 with it by engagament of said lever 91 with a pin 94 on the arm 92. After the lever 92 has thus been rocked, said lever is retained in position by a latch 95 pivoted at 99a to the frame plate 50 and engaging a pin 96 on the lever 92.

This lever 92 is connected through a link 97 (Fig. 3) to the triangular plate 41 which is pivoted to the front card stop post 33, and when the two-stage shaft 82 is thus rocked, the lever 92 rocks the triangular plate 41 clockwise about pivot 40 to bring the roller 42 clear of the operating cam 43, whereby the front card stop 30 is permitted to descend. The card, therefore, is immediately advanced by the continuously rotating feed rolls 29a to its second position in which it is arrested by the rear card stop 31 which is still retained in its raised position by the means now to be described.

Resting against the triangular plate 41 is a pin 98 (Fig. 4) on a latch 99 for the rear card post 34 which latch is pivoted to the frame plate 50 at 99a, and when the triangular plate 41 is thus actuated it permits this latch 99 to engage a projection 100 on a plate 100a carried by the the rear card stop 34 thereby preventing the the rear card stop post 34 thereby preventing the action of its spring 49.

Pivoted to the frame of the mechanism at 101 is an obstructor arm 102 (Figs. 1 and 3) which when rocked counter-clockwise is disposed to arrest operation of the card feed quadrant 16. To this end the obstructor arm 102 has at its upper end a lug 103 which engages below the end of the arm 20 secured to the quadrant and prevents the latter reaching the end of its movement in the clockwise direction. The driving clutch projection carried by the pinion 15 and described in specification No. 1,661,684 is, therefore, unable to engage with the driven clutch element secured to the shaft 12 and, therefore, on the next counter-clockwise movement of the quadrant 16 the pinion 15 rotates idly. Hence the shaft 12 is not rotated and the picker 1 and designation pin box 6 are inoperative. The obstructor arm 102 is pivoted at 102a to a link 104 carrying a pin 105 which is engaged by a lever 106 on the two-stag shaft 82 (Figs. 3 and 5) so that when said shaft 82 is rocked as described above, the obstructor 102 is rocked to bring its lug 103 into the path of the arm 20 of the quadrant 16, whereby the card feed is arrested. The link 104 is supported by means of a pin and slot connection 104a to the frame.

Since this quadrant also actuates the designation pin box 6 the latter is also arrested. The timing of the arrest of the quadrant 16 is such that when said quadrant is arrested the designation pin box described in Patent No. 1,661,684 is in a position such that its own card stop, which is attached to it, retains the card which was last fed to it by the picker. In this way, the card is prevented from being fed on to the item sensing pin box 6 by the feed rolls 4 which rotates continuously.

Thus when a card having two sets of data perforations enters the item sensing pin box 29 and is sensed during the first reciprocation thereof, the triangular plate 41 is swung into a position in which the roller 42 is clear of the cam 43, whereby the front card stop 30 is permitted to descend under the action of its spring 48 after the card has been sensed once. At the same time the latch 99 is operated to retain the rear card stop 31 in its raised position, so that when the front card stop 30 descends the card is not ejected but is merely advanced by the feed rolls 29a until arrested by the rear card stop. Further, the obstructor arm 102 arrests the card feed quadrant 16 whereby the feed of the next card is prevented.

After the item sensing pin box 29 has performed the second sensing operation the latch 99 for the rear card stop 31 is rocked clockwise by one of two pins, 107, 108 (Fig. 4) on the cam 43 secured to the half speed shaft 44. Consequently the latch 99 moves clear of the projection 100 on the rear card stop post 34 and the latter descends under the action of its spring 49 thereby permitting the card to be ejected by the feed rolls 29a. The latch 95 for the arm 92 on the two-stage shaft 82 carries a nose 95a pulled by a spring 95b against a pin 95c on the latch 99 so that when the latter is rocked clockwise the pin 95c rocks the latch 95 clockwise and disengages it from the pin 96 on the lever 92. This lever 92 is, therefore, permitted to return to normal position under the action of spring 93 thereby restoring the roller 42 on the triangular plate 41 to its normal location relative to the cam 43, and also removing the obstructor 102 from the arm 20 of the card feed quadrant 16.

Since it may be required to disengage the latch 99 for the rear card stop 31 after either an even or an odd number of cards, two disengaging pins 107, 108 are provided on the cam 43.

Since however, one of these pins 107, 108 would release the latch 99 too soon, the latch is provided with a disengaging member 109 pivoted thereto at 110 and against which the pin 107 or 108 engages to release the latch 99, and secured to the two-stage operating shaft 82 is a release arm 111 carrying a pin 111a which engages a tail 109a of the disengaging member 109 and rocks this member 109 out of the path of the pins 107, 108 on the cam 43. The two-stage operating shaft 82 is returned to normal position immediately it reaches the end of its travel and therefore the disengaging member 109 is only held in the inoperative position while one of the pins 107, 108 passes by it. When the next pin comes round, this pin contacts with the disengaging member 109 and releases the latch 99 for the rear card stop 31, thereby allowing said card stop to descend and permit ejection of the card.

Means is also provided according to the invention for delaying the operation of the total taking mechanism for one cycle of the tabulator main shaft 24 each time a change in group designation is detected on a card punched with two sets of data. By this means when the last card of a group is one which contains two sets of data, an extra cycle is afforded to permit the second set of data to be transmitted to the adding mechanism before the total taking mechanism commences to operate.

The total taking mechanism is of the kind described in British specification No. 371,849 and only so much of the mechanism described in specification No. 371,849 as is necessary for an understanding of the invention will be described in the present specification. In the drawings to the present specification parts which also appear in the drawings to specification No. 371,849 will be given the same reference numerals as in that specification.

In the machine described in the complete specification No. 371,849 three pairs of parallel bars shown at 115, 124, 116, 125 and 117, 126 respectively are mounted on top of the designation sensing pin box so as to rise and fall with it.

Figure 10:
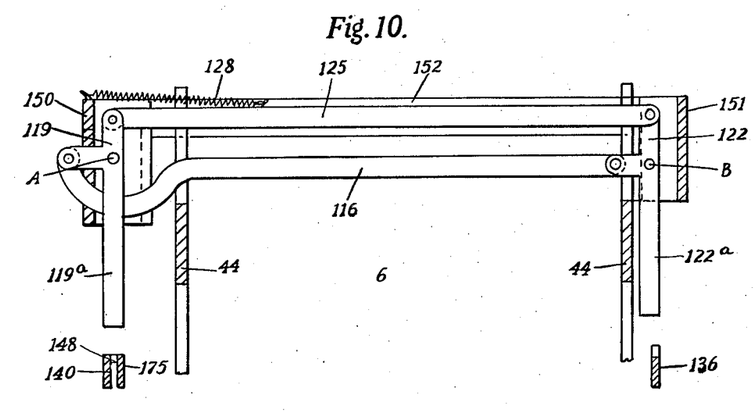
Fig. 10 shows a detail of the mechanism for controlling the total taking mechanism.

As shown in Figures 9 and 10 in the machine according to the present invention the pairs of parallel bars above referred to are not carried by the end plates 44 of the designation pin box 6, but are mounted in brackets 150, 151 carried by a bar 152 which passes through slots in the end plates 44 so as to be capable of sliding in the slots. A lug 153 on the bracket 150 is slidably supported on a pin 154 projecting from the one end plate 44 and a lug 155 on the bracket 151 is likewise slidably supported on a similar pin 154a (Fig. 1) projecting from the other end plate 44.

The operation of these parallel bars is fully described in specification No. 371,849, but it will be briefly outlined in the following description with particular reference to Figure 10 which shows the pair of bars 116, 125.

The upper bar 125 is pivoted at its left hand end to a bell crank 119 pivoted on a shaft A supported in the bracket 150 and the lower bar 116 is pivoted to a horizontal arm of this bell crank 119. The bell crank 119 has a depending tail 119a the function of which will be explained later.

At its right hand end the bar 125 is pivoted to a bell crank 122 freely mounted on a shaft B mounted in the bracket 151, while the right hand end of the lower bar 116 is pivoted to a horizontal arm of this bell crank 122, the bell crank 122 also has a depending tail 122a, the function of which will be explained later.

A spring 128 connects the bar 125 to the bracket 150 and tends to pull the bar 125 to the left in Figure 10. When the spring 128 pulls the bar 125 to the left, the bell cranks 119 and 122 are rocked counter-clockwise about their respective pivots A and B and the bar 116 consequently descends.

The pair of bars 115, 124 is mounted in a similar manner to the bars 116, 125, the corresponding bell cranks being shown at 118 and 121 respectively in Figure 9.

Also the pair of parallel bars 117, 126 are likewise mounted in the same manner as the bars 116, 125 and the corresponding bell cranks are shown at 120 and 123 in Figure 9.

Figure 1:
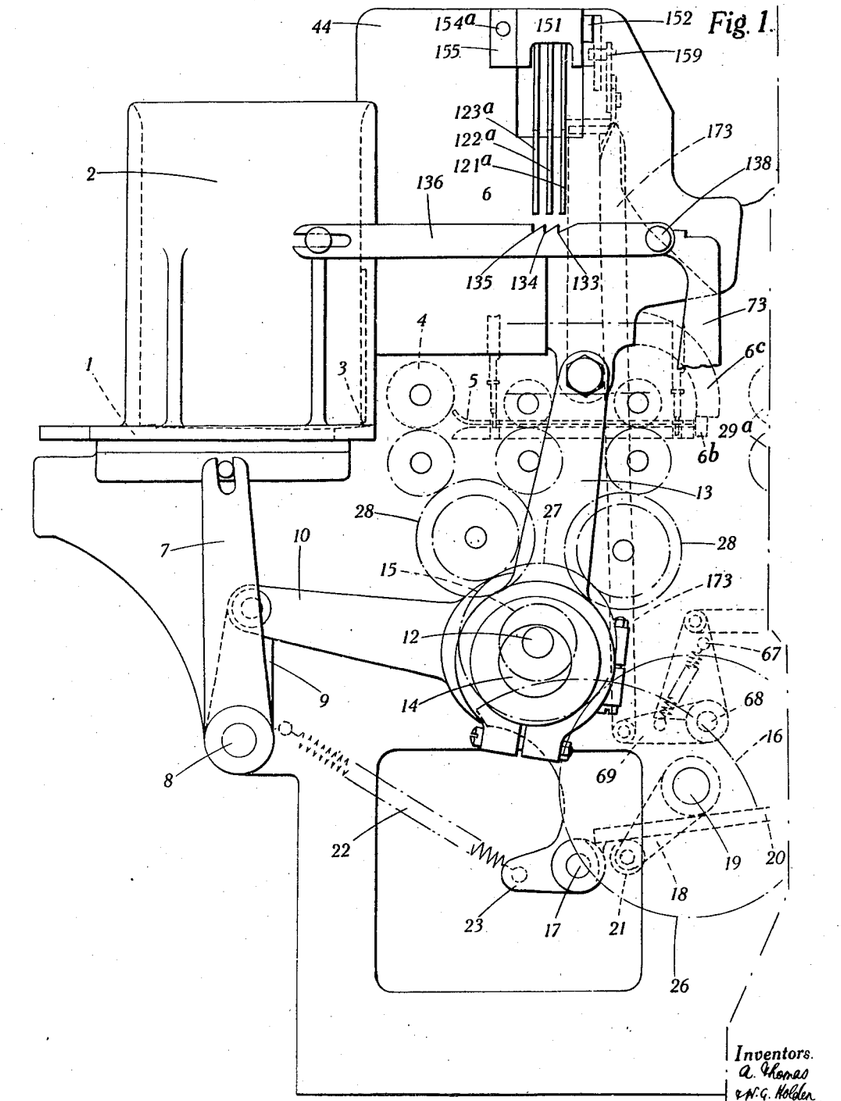
Figs. 1 and 1A together form a general elevation of the part of the tabulator containing the mechanism according to the invention.
Figure 1A:
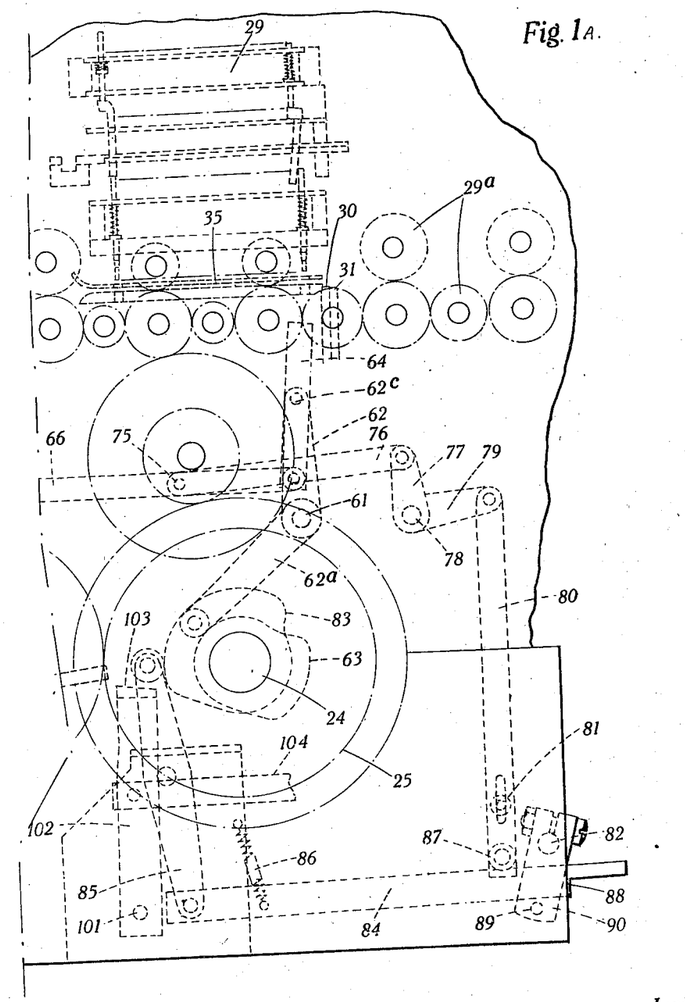

The bell cranks 120 and 123 have tails 120a and 123a respectively, while the bell crank 121 also has a tail 121a (see also Figure 1).

When the designation pin box 6 is in its uppermost position the tail 119a of bell crank 119 stands over a lug 148 on a lever 140 (Figures 9 and 10), and the tail 120a of the bell crank 120 stands over the end of a lever 175 (Figures 9 and 10). Also when the pin box 6 is in its uppermost position the tails 121a, 122a and 123a of the bell cranks 121, 122 and 123 stand above corresponding teeth 133, 134 and 135 formed in a slide 136 (Figures 1 and 10) which is pivoted at 138 to a total testing lever 73 described in specification No. 371,849.

As explained in specification No. 371,849 a bell crank 131 (not shown in the accompanying drawings) prevents the lower bars 115, 116 and 117 from descending when the pin box 6 is at the top of its stroke. As the pin box 6 descends this bell crank moves away from below the parallel bars 115, 116 and 117 and permits the springs 127, 128 and 129 respectively attached to the upper bars 124, 125 and 126 to pull these upper bars to the left in Figures 9 and 10, whereby the bell cranks 118, 119, 120, 121, 122 and 123 are rocked counter-clockwise so that as the pin box 6 continues to descend taking with it the assembly of parallel bars, the lower ends of the tails 119a, 120a swing down to the right of the lug 148 and lever 175 respectively and do not engage these levers, likewise the tails 121a, 122a, 123a swing down to the right of the bar 136 (Figure 10) and do not engage this bar.

As also explained in specification No. 371,849 when a change in designation occurs in a subgroup the bar 115 is prevented from descending with the designation pin box 6 so that the associated spring 127 cannot pull the corresponding upper bar 124 to the left, accordingly the bell cranks 118 and 122 are not rocked and therefore as the pin box descends the lower end of the tail 121a moves into the path of a tooth 133 on the slide 136 (see Figure 1).

The total testing lever 73 to which this slide is pivoted normally rocks at each machine cycle and when obstructed initiates a sub-total operation, consequently when the bar 115 is prevented from descending with the designation pin box and the tail 121a engages the tooth 133 the total testing lever 73 is obstructed and a sub-total taking operation ensues.

When a change in designation in a first main group occurs the bar 116 is prevented from descending with the designation pin box and as a result the bell cranks 119 and 120 (Figure 10) are prevented from rocking under the action of the spring 128. Consequently the lower end of the tail 122a moves into the path of the tooth 134 on the slide 136, whereby the total testing lever 73 is obstructed thereby initiating a sub-total operation. In addition, the lower end of the tail 119a engages the lug 148 and rocks the lever 140 whereby as explained in specification No. 371,849 mechanism is set in motion to cause the taking of a first grand total after the sub-total taking operation has been completed.

When a change in designation occurs in a second main group the bar 117 is prevented from descending with the designation pin box and consequently the bell cranks 120 and 123 are prevented from rocking. As the pin bix descends the lower end of the tail 123a engages the tooth 135 of the slide 136 whereby a sub-total taking operation is initiated. At the same time the lower end of the tail 120a engages the lever 175 and rocks it thereby setting in motion mechanism which causes the taking of a second grand total after the sub-total taking operation has been completed.

A spring 156 connected to the bar 152 pulls the whole assembly of parallel bars, together with their brackets 150 and 151 over to the left in Figs. 9 and 10, and the bracket 150 carries a depending lug 157 which is held in engagement with a pin 158 on a bell crank 159 by the action of this spring 156. The bell crank 159 is pivoted at 160 to a bracket 160a secured to a vertical post 6a which guides the vertical movement of the pin box 6. The bell crank 159 is also pivoted to the upper end of the link 173 already described. Accordingly the spring 156 normally holds the link 173 in its lowermost position.

When the assembly of parallel bars is held in this normal position by the spring 156 the tails 119a, 120a, 121a, 122a, 123a operate in the manner described in specification No. 371,849, so that if one of the bars 115, 116, or 117 is prevented from descending with the designation sensing pin box a total taking operation will be caused as described in the aforesaid prior specification.

When a card having two sets of data is sensed, during the first sensing operation the control pin 52 passes through the hole in the card and as already described the upper end of the testing lever 64 is obstructed whereby the link 66 is pulled to the left and the link 173 is raised. The raising of the link 173 rocks the bell crank 159 clockwise whereby the pin 158 attached thereto by acting on the lug 157 pushes brackets 150 and 151 together with the parallel bars over to the right. When the parallel bars are thus pushed to the right, tails 121a, 122a and 123a are in positions such that even if change in designation occurs and one of the bars 115, 116 or 117 is prevented from descending with the designation pin box, the corresponding tail 121a, 122a or 123a passes clear of the teeth on the slide 136 and a total taking operation does not occur. Also the tails 119a, 120a do not engage the lug 148 or the lever 175. Consequently, the parallel bars are rendered inoperative and cannot cause a total taking operation to occur if a change of designation is detected.

During the next cycle the second set of data on the cards is sensed and as the control hole is only sensed during the first sensing stage and not during the second, the control pin 52 is held up by the blank surface of the card during the second sensing stage, therefore permitting free movement of the sensing lever 64, so that the brackets 150 and 151 together with the parallel bars are returned by the spring 156 to the operative position. Accordingly during the second cycle after the change of designation the total taking operation commences.

When the last card in the magazine has been sensed and the machine makes another sensing operation, there is no card in the pin box 29 and the control pin 52 would move down to its fullest extent just as if a card having a control hole were present, and would cause a delay of the total taking operation which automatically occurs after the sensing of the last card.

In specification No. 401,012 there is described a lever 47 (shown at 161 in the accompanying drawings) which rocks clockwise when there is no card in the pin box.

In the machine according to the invention there is mounted about the pivot 162 of this lever a lever 164 connected by a spring 165 to the lever 161 and having a nose 166 held by a spring 167 against a pin 168 on a lever 169 freely mounted on the pivot 162.

When there is no card in the pin box 29 the lever 161 descends and the lever 164 follows its movement, whereby the spring 167 pulls the lever 169 clockwise. A cam lug 170 on the lower end of the lever 169 engages a lug 171 on the slide 55 and pushes this slide to the left thereby moving the arm 57 clear of the testing lever 64 so that the latter is free to move without hindrance and the mechanism for delaying the total is not operated.

In order to render the mechanism according to the invention inoperative when desired a manually operable control device is provided comprising a plate 172 having a slot 174 engaging pins 176 on the bracket 60 so that the plate 172 can slide. The plate 172 is pivoted to a link 177 (Figs. 2 and 9) guided in a slot 178 on a bracket 179 fixed to the machine frame and has at its free end a hand grip 180 (Fig. 9). In the position shown in the drawings the plate 172 is in the position which permits two stage sensing to occur, i. e., each card which has a control hole will be held in the pin box 29 during two consecutive reciprocations thereof, and each card which does not have a control hole will be held in the pin box 29 during only one reciprocation thereof.

If the link 177 is pulled to the right in Figs. 2 and 9 until the notch 181 engages with the bottom of the slot 178 then the plate 172 is moved to the right and a projection 182 thereon holds the lever 169 permanently over to the right thereby preventing it from operating. At the same time a cam face 183 on the plate 172 engages an extension 184 of the arm 57 and holds the latter permanently clear of the testing lever 64, so that the control pin 52 is ineffective.

The purpose of this arrangement is to render the two stage sensing mechanism inoperative when the tabulator is handling a series of cards each of which carries only a single set of data perforations. Some of these cards may possibly bear, in the position used for the control hole, a hole which is only relevant when the card is being handled not in the tabulator, but in another machine, for example, a sorting machine. In such a case it is desired that this particular hole shall be ineffective when the card is in the tabulator.

The standard form of card has 45 columns for the reception of data, and each column has 12 hole positions.

In a card for use in machines according to the invention the holes punched at the first punching stage are punched in the normal hole positions, while the holes punched at the second stage are punched in the same columns but between the normal hole positions. Thus the digit 6 when punched in the first stage would be punched in the normal 6 position, but when punched in the second stage the digit 6 would be punched between the normal 6 and 7 positions. That is to say, the holes punched in the first stage are nearer to the leading edge of the card by half the vertical pitch of the hole positions in the direction of the column, than are the holes punched in the second stage.

The control hole is punched with the first stage, and any designatory matter is also punched with the first stage. Thus cards for use according to the invention may have two sets of information punched therein, together with a control hole and a single designation common to both sets of information.

The machines according to the invention are particularly useful in that two lines of a customer's name and address may be punched in a single card, and a quantity of goods, together with their value may be punched at the same time as the holes representing the name are punched, so that at a single passage of the card through the tabulator, the name, together with the quantity and value of the goods are printed all in one line at the first sensing stage, while the address is printed on the next line below at the next stage. A designation, such as the date, may also be punched in the first stage, so that it is printed on the same line as the name.

The invention is also applicable to cards punched according to one or other of the usual codes, wherein in order to represent letters of the alphabet, two or more holes may be punched in one column, e. g., the letter F may be represented by a hole in the 12 position and a hole in the 3 position in the same column, while the letter T may be represented by a hole in the 11 position and a hole in the 3 position in the same column.

In such a case, if a card has the letter F punched in a given column in the first stage and the letter T in the same column in the second stage, then in that column there would be one hole in the normal 12 position and a hole in the normal 3 position representing F, together with a hole between the 11 position and the 0 position and another hole between the 3 position and the 4 position in the same column, these two latter holes representing T. Thus there would be four holes in all in the one column.

What we claim is:

1. In a record card controlled statistical machine having card sensing means including a control sensing element positioned to sense a control hole in a card, the combination of a front card stop and a rear card stop, of which the front card stop is so disposed in relation to the sensing means as to arrest a card in position for sensing of holes punched therein in the normal hole positions thereon, while the rear card stop is disposed behind the front card stop by a distance equal to half the pitch of the hole positions along a card column, whereby said rear card stop, when projected alone into the card path arrests a card in position for sensing holes displaced from the normal hole positions by half the pitch of the said hole positions, continuously rotating feed rolls for feeding a card until said card is arrested by one or the other of the card stops, means normally operative to deliver a card to said feed rolls at each sensing operation, card stop actuating means normally operative to move both card stops into the card path at each sensing operation, means normally operative to withdraw both card stops after each sensing operation, a device for preventing the withdrawal of the rear card stop after the sensing operation during which a control hole is sensed whereby the card is advanced by the feed rolls until arrested by the rear card stop, a device for disabling the card stop actuating means during the sensing operation next following that in which a control hole is sensed, a device for rendering the card delivery means inoperative during the sensing operation next following that in which a control hole is sensed, normally inoperative actuating means for all said three devices, means operable by said control hole sensing element to render said actuating means operative, and means for restoring said actuating means to its normal inoperative condition after the sensing operation next following that in which a control hole is sensed.

2. In a record card controlled statistical machine having a main shaft and card sensing means including a control sensing element positioned to sense a control hole in a card, the combination of a front card stop and a rear card stop, of which the front card stop is so disposed in relation to the sensing means as to arrest a card in position for sensing of holes punched therein in the normal hole positions thereon, while the rear card stop is disposed behind the front card stop by a distance equal to half the pitch of the hole positions along a card column, whereby said rear card stop when projected alone into the card path arrests a card in position for sensing holes displaced from the normal hole positions by half the pitch of said hole positions, continuously rotating feed rolls for feeding a card until said card is arrested by one or the other of the card stops, means normally operative to deliver a card to said feed rolls at each sensing operation, a spring to each card stop, said spring urging said card stops out of the card path, a shaft driven at half the speed of the machine main shaft, a cam secured to said half-speed shaft, and having two diametrically opposite peaks, a follower member connected to the front card stop and co-operating with said cam whereby said cam tends to raise the front card stop at each revolution of the main shaft, a one way connection between the front card stop and the rear card stop whereby when said front card stop is moved into the card path said rear card stop is also moved into the card path, a control shaft, normally inoperative means for rocking said control shaft, means for rendering said rocking means operative when the control sensing element senses a hole, a connection between said control shaft and said follower member, operative when said shaft is rocked to withdraw the follower member from engagement with the cam, thereby preventing the front card stop from being raised in the next following sensing operation on the card, a latch for the rear card stop, a connection between the control shaft and said latch, operative, when the control shaft is rocked, to cause the latch to engage the rear card stop and prevent its descent, normally ineffective means for disabling the card delivery means, means on said control shaft for rendering said disabling means effective when said control shaft is rocked, means actuated by the half-speed shaft after the second sensing operation has been performed on the same card to disengage the latch from the rear card stop, thereby permitting the rear card stop to descend and release the card, and means for restoring the control shaft to its normal position after the sensing operation next following that in which the control hole is sensed.

3. In a record card controlled tabulating machine having group control mechanism for initiating a total taking operation when a change in group designation occurs, and card sensing means including a control sensing element positioned to sense a control hole in a card, the combination of a front card stop and a rear card stop, of which the front card stop is so disposed in relation to the sensing means as to arrest a card in position for sensing of holes punched therein in the normal hole positions thereon, while the rear card stop is so disposed behind the front card stop by a distance equal to half the pitch of the hole positions along a card column, whereby said rear card stop, when projected alone into the card path, arrests a card in position for sensing holes displaced from the normal hole positions by half the pitch of said hole positions, continuously rotating feed rolls for feeding a card until said card is arrested by one or other of the card stops, means normally operative to deliver a card to said feed rolls at each sensing operation, a spring to each card stop, said springs urging said card stops out of the card path, a shaft driven at half the speed of the tabulator main shaft, a cam secured to said half speed shaft and having two diametrically opposite peaks, a follower member connected to the front card stop and co-operating with said cam whereby said cam tends to raise the front card stop at each revolution of the main shaft, a one-way connection between the front card stop and the rear card stop whereby when said front card stop is moved into the card path said rear card stop is also moved into the card path, a control mechanism normally inoperative means for actuating said control mechanism, means for rendering said actuating means operative when the control sensing element senses a hole, a connection between said control mechanism and said follower member, operative when said mechanism is actuated, to withdraw the follower member from engagement with the cam, thereby permitting the front card stop to descend under spring action after the first sensing operation on the card, a latch for the rear card stop, a connection between the control mechanism and said latch, operative when the control mechanism is actuated to cause the latch to engage the rear card stop and prevent its descent, normally ineffective means for disabling the card delivery means, means in said control mechanism for rendering said disabling means effective when said control mechanism is actuated, means actuated by the half speed shaft after the second sensing operation has been performed on the same card to disengage the latch from the rear card stop, thereby permitting the rear card stop to descend and release the card, means for restoring the control mechanism to its normal condition after the sensing operation next following that in which the control hole is sensed, a device for rendering the group control mechanism inoperative and means, also actuated by the control mechanism, to render said device effective in the cycle in which the control hole is sensed.

4. In a record card controlled statistical machine having card sensing means including a control sensing element positioned to sense a control hole in a card, the combination of a front card stop and a rear card stop, of which the front card stop is so disposed in relation to the sensing means as to arrest a card in position for sensing of holes punched therein in the normal hole positions thereon, while the rear card stop is disposed behind the front card stop by a distance equal to half the pitch of the hole positions along a card column, whereby said rear card stop, when projected alone into the card path, arrests a card in position for sensing holes displaced from the normal hole positions by half the pitch of said hole positions, continuously rotating feed rolls for feeding a card until said card is arrested by one or the other of the card stops, means normally operative to deliver a card to said feed rolls at each sensing operation, a spring to each card stop, said springs urging said card stops out of the card path, means normally operative to move the front card stop into the card path prior to each sensing operation and to release said front card stop to the action of its spring after each sensing operation, a one-way connection between the front card stop and the rear card stop whereby when said front card stop is moved into the card path said rear card stop is also moved into the card path, a device operable to lock the rear card stop against the action of its spring, after the sensing operation during which a control hole is sensed, thereby preventing withdrawal of said rear card stop after said sensing operation, a device for disabling the operating means for the front card stop during the sensing operation next following that in which a control hole is sensed, a device for disabling the card delivery means during the sensing operation next following that in which a control hole is sensed, normally inoperative actuating means for all said three devices, means operable by said control hole sensing element to render said actuating means operative, and means for restoring said actuating means to its normal inoperative condition after the sensing operation next following that in which a control hole is sensed.

5. In a record card controlled tabulating machine having group control mechanism for initiating a total taking operation when a change in group designation occurs, and card sensing means including a control sensing element positioned to sense a control hole in a card, the combination of a front card stop and a rear card stop, of which the front card stop is so disposed in relation to the sensing means as to arrest a card in position for sensing of holes punched therein in the normal hole positions thereon, while the rear card stop is disposed behind the front card stop by a distance equal to half the pitch of the hole positions along a card column, whereby said rear card stop, when projected alone into the card path, arrests a card in position for sensing holes displaced from the normal hole positions by half the pitch of said hole positions, continuously rotating feed rolls for feeding a card until said card is arrested by one or the other of the card stops, a spring to each card stop, said springs urging said card stops out of the card path, means normally operative to move the front card stop into the card path prior to each sensing operation and to release said front card stop to the action of its spring after each sensing operation, a one-way connection between the front card stop and the rear card stop whereby when said front card stop is moved into the card path said rear card stop is also moved into the card path, a device for rendering the group control mechanism inoperative, a device operable to lock the rear card stop against the action of its spring after the sensing operation during which a control hole is sensed, thereby preventing withdrawal of said rear card stop after said sensing operation, a device for disabling the operating means for the front card stop during the sensing operation next following that in which a control hole is sensed, a device for rendering effective, in the cycle in which a control hole is sensed, the device which renders the group control mechanism inoperative, normally inoperative actuating means for all said four devices, means operable by said control hole sensing element to render said actuating means operative, and means for restoring said actuating means to its normal inoperative condition after the sensing operation next following that in which a control hole is sensed.

6. In a record card controlled tabulating machine having card sensing means including a control sensing element positioned to sense a control hole in a card, and group control mechanism for initiating a total taking operation when a change in group designation occurs, said group control mechanism including a movable slide formed with a plurality of teeth, means tending to move said slide at each sensing operation, a plurality of rockable levers so mounted in relation to said slide that any one of said levers, when rocked, engages with a corresponding tooth of said slide to arrest the movement thereof and thereby initiate a total taking operation, and a plurality of control bars, one pivoted to each of said rockable levers, the combination of a front card stop and a rear card stop, of which the front card stop is so disposed in relation to the sensing means as to arrest a card in position for sensing of holes punched therein in the normal hole positions thereon, while the rear card stop is disposed behind the front card stop by a distance equal to half the pitch of the hole positions along a card column, whereby said rear card stop, when projected alone into the card path, arrests a card in position for sensing holes displaced from the normal hole positions by half the pitch of said hole positions, continuously rotating feed rolls for feeding a card until said card is arrested by one or the other of the card stops, means normally operative to move the front card stop into the card path prior to each sensing operation and to release said front card stop to the action of its spring after each sensing operation, a one-way connection between the front card stop and the rear card stop whereby, when said front card stop is moved into the card path, said rear card stop is also moved into the card path, a device operable to lock the rear card stop against the action of its spring after the sensing operation during which a control hole is sensed, thereby preventing withdrawal of said rear card stop after said sensing operation, a device for disabling the operating means for the front card stop during the sensing operation next following that in which a control hole is sensed, a device for disabling the card delivery means during the sensing operation next following that in which a control hole is sensed, a device for moving the rockable levers out of range of the teeth in the slide during the sensing operation in which a control hole is sensed, normally inoperative actuating means for all said four devices, means operable by said control hole sensing element to render said actuating means operative, and means for restoring said actuating means to its normal inoperative condition after the sensing operation next following that in which a control hole is sensed.

ARTHUR THOMAS.
NORMAN GEOFFREY HOLDEN.